UNITED STATES PATENT OFFICE.

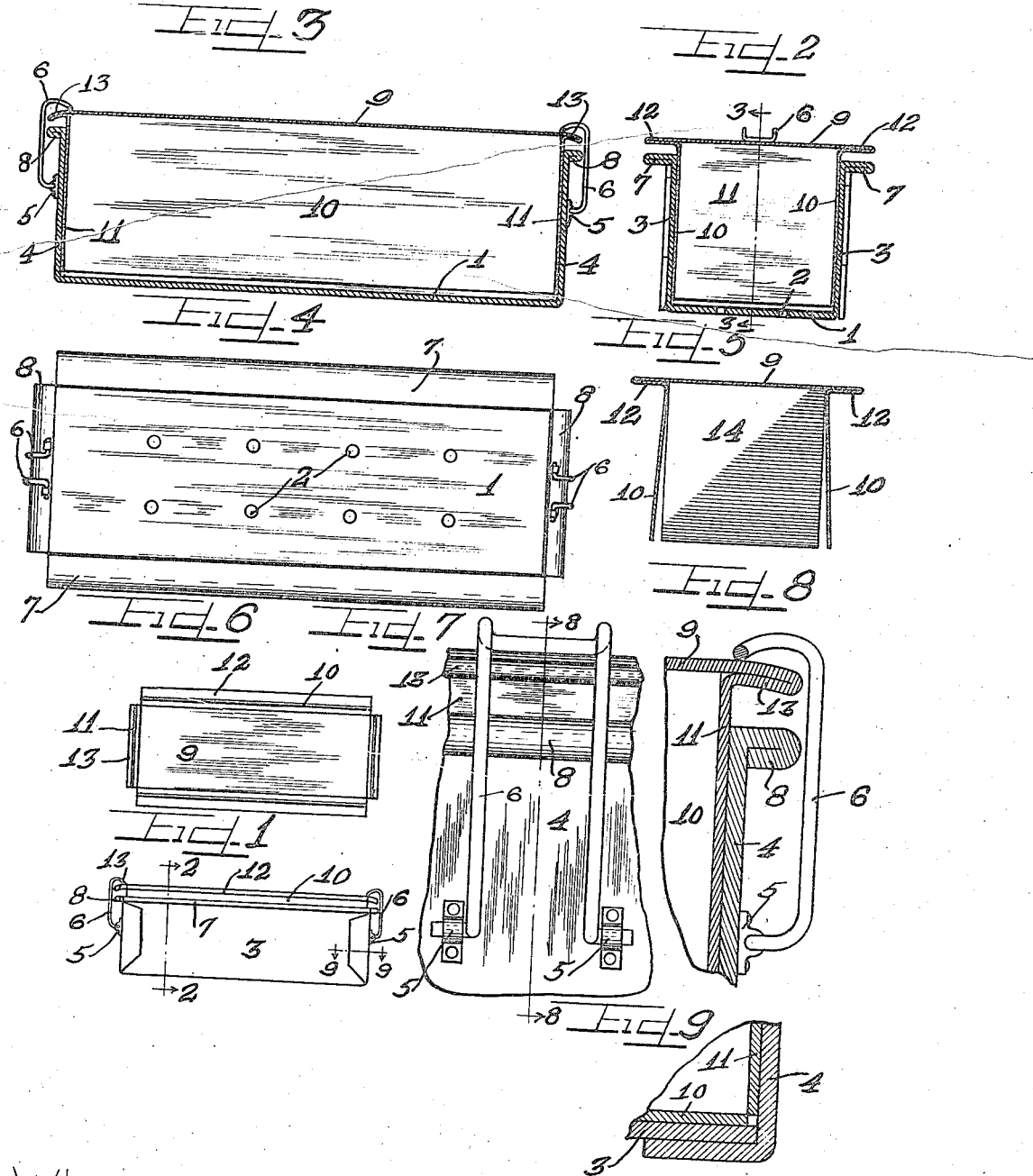

JULIUS R. MEYERS, OF GLENCOE, ILLINOIS.

CHEESE MOLD.

1,402,782.   Specification of Letters Patent.   Patented Jan. 10, 1922.

Application filed January 26, 1921. Serial No. 439,923.

*To all whom it may concern:*

Be it known that I, JULIUS R. MEYERS, a citizen of the United States, and a resident of the city of Glencoe, in the county of Cook and State of Illinois, have invented certain new and useful Improvements in a Cheese Mold; and I do hereby declare that the following is a full, clear, and exact description of the same, reference being had to the accompanying drawings, and to the numerals of reference marked thereon, which form a part of this specification.

This invention relates to improvements in small individual cheese molds of the type disclosed in my pending application for a "cheese mold," filed November 18th, 1920, Serial No. 424,828, and adapted for use in the process of forming cheese set forth in my pending application for patent for a "process for forming cheese," filed December 17th, 1920, Serial No. 431,458.

This invention also relates more particularly to an improved type of a cheese mold wherein an apertured base section is adapted to have removably telescoped therein a compressing section having sides and ends adapted to spring out of engagement with a cheese when the compressing section is removed from the base section after a cheese has been formed.

It is an object of this invention to provide a cheese mold comprising interfitting sections one of which is adapted to be removed from the other after a cheese has been formed to permit the walls of the removed section to be sprung out of engagement with the cheese to release the same.

Another object of the invention is to provide a cheese mold wherein one of the sections has the walls thereof resiliently connected to a top independently of one another to permit quick release of a cheese.

It is also an object of the invention to construct a cheese mold wherein a top section is adapted to have the walls thereof moved toward one another to fit within a base section having clamping members pivoted thereon for the purpose of holding the top section in compressing position to compress a piece of green cheese to a predetermined size between the base section and the top section to form a finished cheese.

It is furthermore an object of the invention to provide a cheese mold adapted to permit a cheese to be readily removed therefrom.

It is a further object of this invention to provide a compressible mold wherein a piece of green cheese cut from a large green cheese is adapted to be compressed to a predetermined size between telescoping members which are locked together and then subjected to heat to expand the cheese within the mold after which the mold is set away for a period to allow gradual cooling of the cheese before the cheese is removed from the mold and put away to cure.

It is an important object of this invention to provide a cheese mold of simple, inexpensive and effective construction wherein the walls of one casing section are adapted to spring away from one another when removed from a base section to cause release of a cheese compressed in the mold.

Other and further important objects of the invention will be apparent from the disclosures in the specification and the accompanying drawings.

The invention (in a preferred form) is shown on the drawings and hereinafter more fully described.

On the drawings:—

Figure 1 is a side elevation of a cheese mold embodying the principles of this invention.

Figure 2 is an enlarged cross-section taken on line 2—2 of Figure 1.

Figure 3 is a longitudinal section of the device taken on line 3—3 of Figure 2.

Figure 4 is a bottom plan view of the device.

Figure 5 is a transverse section of the upper mold section removed from the lower mold section showing the walls sprung out of engagement with a cheese to release the same.

Figure 6 is a reduced bottom plan view of the upper mold section.

Figure 7 is an enlarged fragmentary view of one end of the mold illustrating a hooked clamping member in closed position.

Figure 8 is a section taken on line 8—8 of Figure 7.

Figure 9 is an enlarged fragmentary detail section taken on line 9—9 of Figure 1.

As shown on the drawings:

The cheese mold comprises a lower or base section and an upper or inner section adapted to be telescoped when a cheese is to be formed. The base section embraces a bottom 1, having a plurality of outlet apertures 2 therein. Integral with the bottom 1 are two sides 3 and two end walls 4 which together with said bottom form a container for holding a piece of green cheese which is to be pressed to form a small cheese of a predetermined size. Rigidly secured on each end wall 4 are a pair of bearing brackets 5 for pivotally supporting a hooked clamp 6. The upper margins of the side walls 3 and the end walls 4 are bent outwardly and then inwardly on themselves to form side flanges 7 and end flanges 8.

The inner casing or top section is of unitary construction and comprises a top plate 9 and independent side walls 10 and end walls 11. The side walls 10 are integrally connected to the side margins of the top plate 9 by folded side spring flanges 12, while the end walls 11 are integrally connected to the end margins of the top plate 9 by folded end spring flanges 13. The folded side and end flanges 12 and 13 are rigid but the lower folds thereof act as springs to normally hold the side walls 10 and the end walls 11 sprung outwardly into released position as illustrated in Figure 5.

The operation is as follows:

To form a cheese of a predetermined size a piece of green cheese of a size slightly larger than the volume of the mold is placed in the base section or in the top section. The top section is now placed in position by first pressing the side walls 10 and the end walls 11 inwardly to fit between the walls of the base section and the sides of the piece of green cheese. Pressure is applied to the top plate 9 thereby gradually causing the top section walls to telescope into the base section. With the descent of the top section the green cheese is gradually compressed into the mold to the desired size equal to the volume of the mold when fully closed. When the top section has reached its lowermost position the two end locks or clamping members 6 are swung upwardly to permit the hooked ends thereof to slidably engage over the downwardly curved end flanges 13. The top section is thus held clamped in position to compress the green cheese within the mold.

The locked mold containing the compressed cheese is inserted in a bath of hot water for a short period. The heat to which the mold is subjected acts to expand the cheese thereby causing an outward pressure resulting in filling out all the cavities and irregularities in the surface of the cheese. A small cheese of a predetermined size having smooth surfaces is thus produced.

After the mold containing the cheese is subjected to heat, the cheese is permitted to gradually cool within the mold for a period of about twelve hours. When a cheese is thus properly formed and cooled within the mold the locking clamps 6 are pulled outwardly out of engagement with the top of the top mold section. The top section is next removed from the bottom or base section. The formed cheese 14 is removed with the top section. As the top section leaves the base section the side walls 10 and the end walls 11 of the top section are permitted to spring outwardly into the position shown in Figure 5 to readily release the compressed individual smooth surfaced cheese 14 which is set away to cure.

Attention is called to the fact that the improved cheese mold of this invention is comparatively simple in construction, and that the spring controlled walls of the mold top section readily permit release of a compressed finished cheese without inconvenience or danger of breaking the cheese during its removal.

I am aware that many changes may be made and numerous details of construction may be varied through a wide range without departing from the principles of this invention, and I therefore do not purpose limiting the patent granted otherwise than necessitated by the prior art.

I claim as my invention:

1. A cheese mold comprising a pair of telescoping sections, members pivoted on one of said sections for locking the sections together, the other of said sections having the walls thereof independent of each other to permit said walls to spring outwardly away from one another when the pivoted members are released and said section is removed from the other section.

2. A cheese mold comprising an apertured base section, a top section adapted to be telescoped into the base section to compress a piece of green cheese within the base section, locking members on said base section adapted to engage said top section to hold the base section and the top section locked together, said top section having the walls thereof independent of each other, and spring means connecting said walls with the top of the top section to permit said walls to spring away from each other to release a finished cheese when the top section is removed from said base section.

3. A cheese mold comprising a base section, and a top section adapted to be telescoped therein to compress a piece of green cheese within the mold to form a finished cheese of a predetermined size, said top section embracing a top plate, flanges integrally formed on the margins thereof, and a wall integral with each flange, said walls adapted to spring outwardly away from one another to release a finished cheese when the top section is removed from the base section.

4. A cheese mold comprising a base section for holding a piece of green cheese, and a one-piece top section having independent walls adapted to be pressed inwardly toward each other to permit the top section to be telescoped into the base section to compress said piece of green cheese into a cheese of a predetermined size.

5. A cheese mold comprising an apertured base section, locking members thereon, and a top section adapted to be telescoped into said base section to be locked in place by said locking members, said top section comprising a top plate the margins of which are formed to afford flanges, and walls integral with said flanges and independent of each other.

In testimony whereof I have hereunto subscribed my name in the presence of two subscribing witnesses.

JULIUS R. MEYERS.

Witnesses:
CHARLES W. HILLS, Jr.,
FRED E. PAESLER.